United States Patent
Chiu et al.

(10) Patent No.: US 7,680,355 B2
(45) Date of Patent: Mar. 16, 2010

(54) DETECTION OF ARTIFACTS RESULTING FROM IMAGE SIGNAL DECOMPRESSION

(75) Inventors: Yi-Jen Chiu, San Jose, CA (US); Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 992 days.

(21) Appl. No.: 11/120,106

(22) Filed: May 2, 2005

(65) Prior Publication Data

US 2006/0245499 A1 Nov. 2, 2006

(51) Int. Cl.
*G06K 9/40* (2006.01)
*G06K 9/38* (2006.01)
*G09G 5/00* (2006.01)

(52) U.S. Cl. .......... 382/266; 382/260; 382/269; 382/272; 382/274; 382/275; 345/611

(58) Field of Classification Search ............... 382/266
See application file for complete search history.

(56) References Cited

U.S. PATENT DOCUMENTS

| | | | | |
|---|---|---|---|---|
| 5,023,919 A | * | 6/1991 | Wataya | 382/263 |
| 5,852,475 A | * | 12/1998 | Gupta et al. | 348/606 |
| 6,041,145 A | * | 3/2000 | Hayashi et al. | 382/268 |
| 6,389,177 B1 | * | 5/2002 | Chu et al. | 382/268 |
| 6,937,662 B2 | * | 8/2005 | Del Corso | 375/240.27 |
| 7,016,420 B1 | * | 3/2006 | Kagechi et al. | 375/240.26 |
| 7,038,710 B2 | * | 5/2006 | Caviedes | 348/180 |
| 7,075,993 B2 | * | 7/2006 | O'Brien, Jr. | 375/240.27 |
| 7,136,538 B2 | * | 11/2006 | Kitagawa | 382/275 |
| 7,155,067 B2 | * | 12/2006 | Jayant et al. | 382/268 |
| 7,292,733 B2 | * | 11/2007 | Monobe et al. | 382/261 |
| 2005/0036558 A1 | * | 2/2005 | Dumitras et al. | 375/240.29 |

OTHER PUBLICATIONS

Coudoux et al., "A post-processor for reducing temporal busyness in low-bit-rate video applications", Signal Processing: Image Communication 18 (2003), pp. 455-463.*

* cited by examiner

*Primary Examiner*—Andrew W Johns
*Assistant Examiner*—Jose M Torres
(74) *Attorney, Agent, or Firm*—Buckley, Maschoff & Talwalkar LLC

(57) ABSTRACT

A method includes making a first determination as to whether a current pixel has a value which reflects a mosquito noise artifact, and determining whether to apply a filtering process at the current pixel based on a result of the first determination. In addition, or alternatively, a method includes making a second determination as to whether a current pixel has a value which reflects a ringing artifact, and determining whether to apply a filtering process at the current pixel based on a result of the second determination.

24 Claims, 6 Drawing Sheets

DETECTION OF ARTIFACTS RESULTING FROM IMAGE SIGNAL DECOMPRESSION

BACKGROUND

It is often desirable to apply compression-encoding to video signals prior to transmission or storage of the video signals. In some commonly employed compression-encoding strategies (e.g., ITU H.261/H.263/H.264 or MPEG 1/MPEG 2/MPEG 4), block transforms (e.g., discrete cosine transform, or "DCT") are applied with motion compensation, followed by quantization of the transform coefficients and entropy encoding. Some of the video signal information is typically lost during compression encoding, particularly during the quantization stage. The loss of information may lead to reduced image quality upon de-compression of the video signal. It is desirable to employ certain approaches to counteract image artifacts generated upon de-compression.

One type of de-compression artifact is known as "mosquito noise", which results from the abrupt truncation of high frequency DCT coefficients during quantization. Mosquito noise typically takes the form of small distortions (seen as "busyness") near edges, especially edges of moving objects. It has proposed to mitigate mosquito noise by applying low pass filtering to the video signal after de-compression. However, the low pass filtering may introduce blurring throughout the image.

Another type of de-compression artifact is known as "ringing noise". This too results from truncation of high frequency DCT coefficients and has the appearance of ripples that extend outwardly from edges. Again low pass filtering may be employed to mitigate ringing noise, but often at the cost of blurring the entire image.

DETAILED DESCRIPTION

Figure 1:
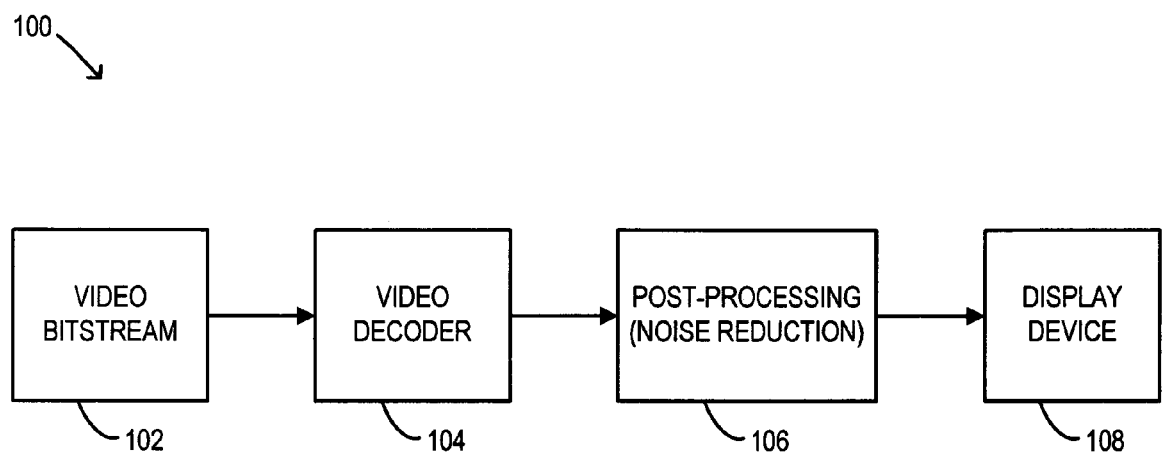
FIG. 1 is a block diagram of an apparatus which generates a video display from a video bitstream in accordance with some embodiments.

FIG. 1 is a block diagram of an apparatus 100 which generates a video display from a video bitstream in accordance with some embodiments.

The apparatus 100 includes a source 102 of a video signal bitstream. For example, the video signal source 102 may receive a video signal via a communication channel (which is not separately shown) or may reproduce a video signal from a storage medium such as a DVD or a hard disk drive. For example, the video signal source may include a video tuner, a satellite earth station, or a DVD player. It will be assumed that the video signal bitstream represents a video signal that has been compression encoded, e.g., in accordance with one of the compression standards referred to above. The video signal source 102 may operate in accordance with conventional practices.

The apparatus 100 also includes a video decoder 104 which is coupled to the video signal source to de-compress the video signal bitstream supplied by the video signal source 102. The video decoder 104 may operate in accordance with conventional principles, and may tend to produce artifacts in the output video image, subject to amelioration via embodiments to be described below.

The apparatus 100 further includes a post-processing block 106 which is coupled to the video decoder 104. The post-processing block 106 performs one or more kinds of post processing on the decompressed video signal output from the video decoder 104. For example, the post-processing block 106 may perform one or more different kinds of noise reduction processing as in one or more of the embodiments described below.

In addition, the apparatus 100 includes a display device 108, such as a conventional television set or a computer display monitor. The display device 108 displays the video signal that is output from the post-processing block 106.

Figure 2:
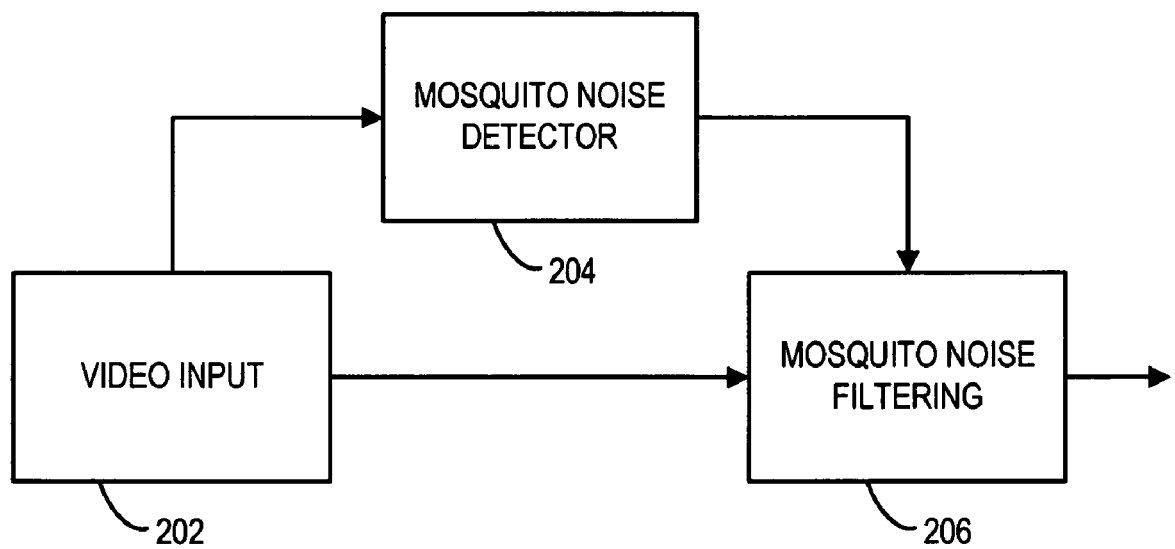
FIG. 2 is a functional block diagram that illustrates some operations of a noise reduction block that is part of the apparatus of FIG. 1.

FIG. 2 is a functional block diagram that illustrates aspects of a noise reduction process performed in the post-processing block 106 in accordance with some embodiments. Block 202 represents the post-processing block (or a noise reduction sub-block) receiving an input video signal (e.g., directly or indirectly from the video decoder 104) that is to be subjected to noise reduction processing. Block 204 represents a process provided in accordance with some embodiments to detect locations (e.g., specific pixels), in the video signal received at 202, which exhibit mosquito noise artifacts. Block 206 represents a process in which filtering is applied to the input video signal received at 202 (based on results obtained by the mosquito noise detector 204), to mitigate the mosquito noise artifacts.

Figure 3:
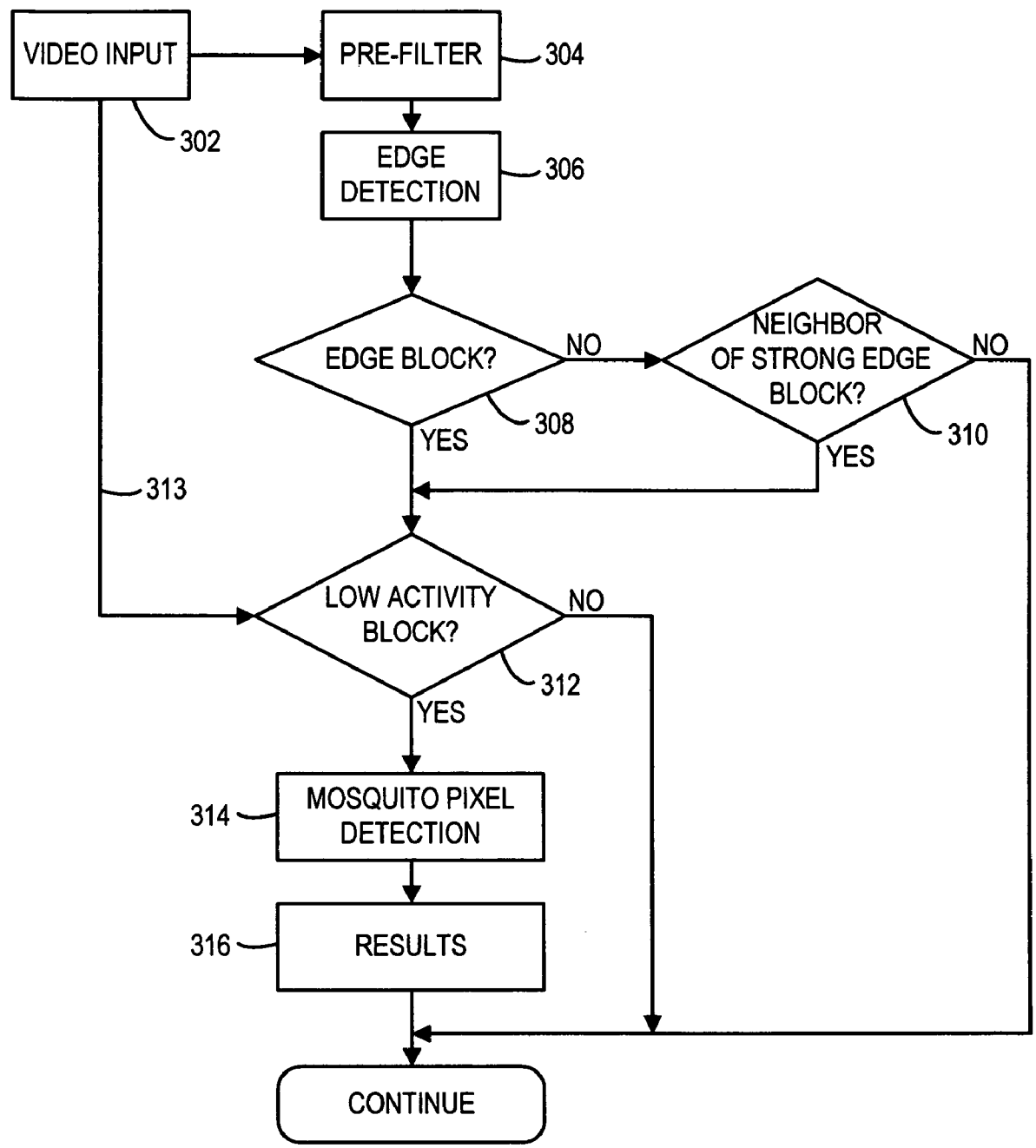
FIG. 3 is a flow chart that illustrates a mosquito noise detection process performed by the noise reduction block.

FIG. 3 is a flow chart that illustrates a mosquito noise detection process performed by the mosquito noise detector sub-block of the pre-processing/noise reduction block 106 in accordance with some embodiments. Block 302 in FIG. 3 represents receipt by the mosquito noise detector sub-block 204 of the decompressed video signal to be filtered for purposes of mosquito noise reduction.

In general, according to some embodiments, the mosquito noise detection process of FIG. 3 is at least partly a pixel-block-based process. In accordance with some embodiments, the same 8 pixel by 8 pixel blocks are used as in some conventional DCT compression encoding/decoding processes. 10×10 pixel blocks may alternatively be employed, as may blocks of other dimensions.

Block 304 represents pre-filtering that may be applied to the input video signal before performing edge detection processing. The pre-filtering is not required but may improve the accuracy of the subsequent edge detection.

As part of the pre-filtering, a 3×3 weighting matrix may be applied to a 3 pixel by 3 pixel array (neighborhood) $NH9(x_0)$ centered at the currently processed pixel $x_0$ to implement a weighting function w. In some embodiments, the weighting matrix employed may be:

$$\begin{bmatrix} 1 & 2 & 1 \\ 2 & 4 & 2 \\ 1 & 2 & 1 \end{bmatrix}$$

To reduce the complexity of the calculations, this two-dimensional matrix may be decomposed into two one dimensional matrices:

$$\begin{bmatrix} 1 \\ 2 \\ 1 \end{bmatrix} * [1 \ 2 \ 1]$$

In some embodiments, the output of the pre-filter for the target pixel $x_0$ may be calculated as follows:

$$(1/16) * \left( \left( \sum_{x \in NH9(x_0)} w(x) * \{x\} \right) + 8 \right),$$

where $w(x)$ is the value of the weighting matrix at the position of the pixel $x \in NH9(x_0)$, and $\{x\}$ is the value of that pixel. It will be noted that 16 is the summation over the weighting matrix and 8 is one-half of that summation, the latter term being applied for purposes of rounding.

Edge detection processing as indicated at 306 follows the pre-filtering at 304. With the edge detection processing, an edge metric value $EM(x_0)$ is calculated for each pixel, $x_0$ again designating the target pixel. Based on the edge metric values, blocks that are likely to exhibit mosquito noise artifacts are identified. These blocks may be edge blocks (blocks which include an edge) and blocks that are neighbors to blocks having strong edges.

Any one of a number of edge detectors may be employed. In some embodiments, the so-called Sobel edge detector may be employed, using the following matrices:

$$E\_h = \begin{bmatrix} -1 & -2 & -1 \\ 0 & 0 & 0 \\ 1 & 2 & 1 \end{bmatrix} \text{ and } E\_v = \begin{bmatrix} -1 & 0 & 1 \\ -2 & 0 & 2 \\ -1 & 0 & 1 \end{bmatrix}$$

The edge metric value may be calculated as follows as the convolution of the edge detection weighting matrices with the 3×3 neighborhood $NH9(x_0)$ of the target pixel:

$$EM(x_0) = |NH9(x_0) * E\_h| + |NH9(x_0) * E\_v|$$

With the edge metric having been determined for each pixel in a pixel block, the pixel block may be classified as either an edge block or not an edge block, as indicated at 308. The classification of the block depends on the classifications of the pixels within the block as "edge pixels", "non-edge pixels" or "texture pixels". A pixel is classified as an edge pixel if its edge metric exceeds a threshold "edge_th". In some embodiments, edge_th is set at 96. A pixel is classified as a non-edge pixel if its edge metric is less than a threshold "non_edge_th". In some embodiments, non_edge_th is set at 32. A pixel is classified as texture pixel if it is neither an edge pixel nor a non-edge pixel. A pixel block is classified as an edge block if the number of edge pixels in the block exceeds a threshold "edge_block_th". In some embodiments (for 8×8 blocks), edge_block_th is set at 4.

If a pixel block is not classified as an edge block at 308, then it is determined, as indicated at 310, whether the pixel block in question has a "strong edge block" as a neighbor. A block is classified as a strong edge block if it has at least one pixel for which the edge metric exceeds a threshold "strong_edge_th". In some embodiments, strong_edge_th is set at 128.

Figure 4:
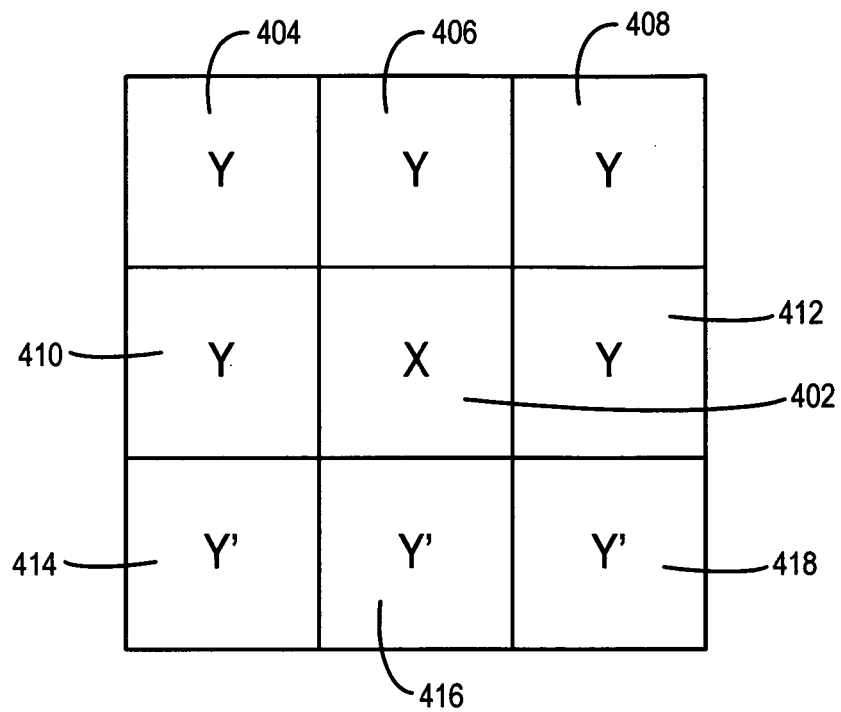
FIGS. 4 and 5 schematically illustrate aspects of the process of FIG. 3.

FIG. 4 schematically illustrates an aspect of the determination as to whether a pixel block is neighbored by a strong edge block. The squares shown in FIG. 4 each represent pixel blocks. Pixel block 402, marked with an "X", is the block for which the determination is currently being made as to whether it is neighbored by a strong edge block. In some embodiments, if any one of the pixel blocks 404, 406, 408, 410, 412, 414, 416, 418 is a strong edge block, then pixel block 402 is considered to be a neighbor of a strong edge block. In other embodiments, to reduce processing complexity and memory requirements, pixel blocks 414, 416, 418, all marked "Y'" and below the target block 402 in the image, are disregarded; in these embodiments, pixel block 402 is considered to be a neighbor of a strong edge block only if at least one of the blocks marked "Y" (i.e. blocks 404, 406, 408, 410 and 412) is a strong edge block.

If a particular block is determined to be either an edge block or a neighbor of a strong edge block, then, as indicated at 312 in FIG. 3, it is next determined whether the block in question is a "low activity" block. This determination is made because mosquito noise is most likely to be visible in a block with little visual activity that is either an edge block or the neighbor of a strong edge block. As indicated by logical connection 313 in FIG. 3, the classification of the blocks selected at 308 or 310 as low activity blocks or not low activity blocks may be performed on a version of the input video signal that has not been pre-filtered. In other words, the video input signal subjected to processing for identification of low activity blocks may by-pass the pre-filtering represented at 304.

A block is classified as a low activity block if two conditions are satisfied. The first condition is that the number of non-edge pixels in the block exceeds a threshold. In some embodiments the threshold is set at 32. The second condition is that the number of non-edge pixels in the block exceeds a product obtained by multiplying the number of texture pixels in the block by a threshold factor. In some embodiments the threshold factor is set to 1; in this case the second condition becomes simply that the number of non-edge pixels in the block exceed the number of texture pixels in the block.

In the previous paragraph, a procedure was described for determining whether a block is a low activity block based on edge characteristics of the pixels in the block. However, in other embodiments, the classification of a block as a low activity block may be made without utilizing edge characteristics. In this alternative, each pixel in the block is classified as a "low activity" pixel or not a low activity pixel based on the statistical variance of pixel values in the neighborhood of the pixel to be classified. To make this classification, a variance metric $Var(x_0)$ is calculated for the target pixel (the pixel to be classified) according to the following formula:

$$Var(x_0) = (1/N) * \sum_{x \in NH(x_0)} \left( \{x\} - \left( (1/N) * \sum_{x \in NH(x_0)} \{x\} \right) \right)^2$$

where:

NH($x_0$) is the set of N pixels (N=9, for example) which forms the neighborhood of the target pixel, and {x} is the value of pixel x which is in the neighborhood of the target pixel.

The target pixel is classified as a low activity pixel if its variance metric Var($x_0$) is less than a threshold. In some embodiments the threshold may be set at 1024 (assuming a range of zero to about 14,600 for possible pixel values). The pixel block, in turn, may be classified as a low activity block if the number of low activity pixels in the block exceeds a threshold, which may be set at 32.

In some embodiments, the following simplified formula may be used to calculate Var($x_0$), in order to reduce processing complexity:

$$(1/N) * \sum_{x \in NH(x_0)} |\{x\} - x_0|$$

Figure 5:
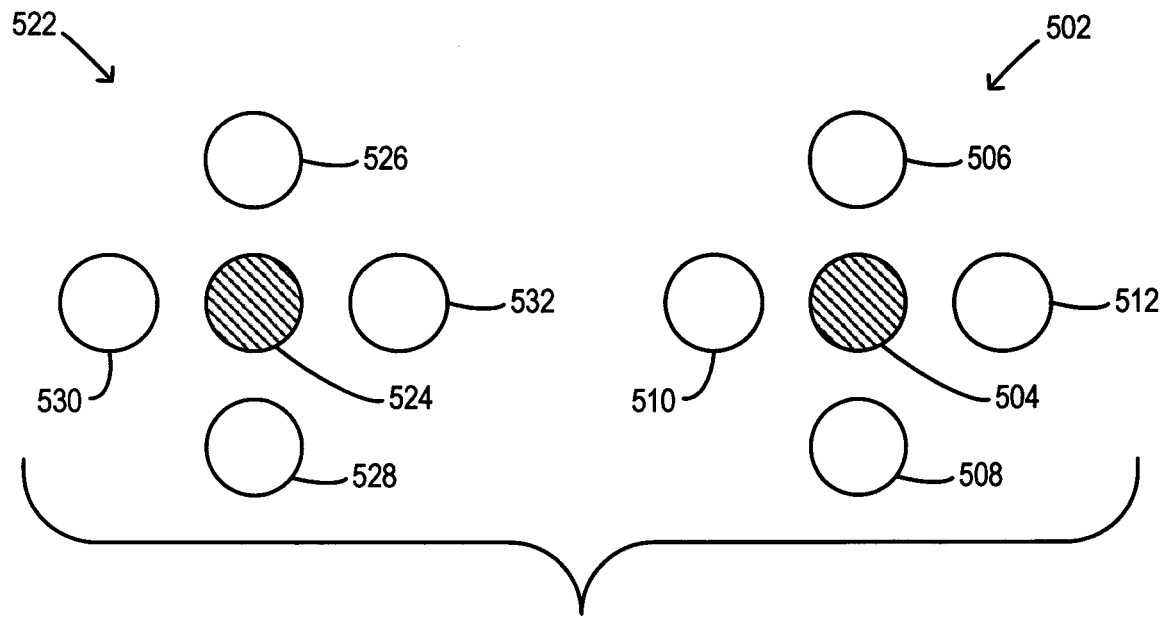

Once a block that is an edge block or neighbors a strong edge block has also been classified as a low activity block, the pixels in the block are examined pixel by pixel (as indicated at 314) to determine for each pixel whether it has a value that reflects a mosquito noise artifact. To determine whether a particular target pixel in such a block is a mosquito noise pixel, a motion metric is calculated for the target pixel. FIG. 5 schematically illustrates aspects of the calculation of the motion metric. As will be seen, the motion metric is calculated as the sum of absolute differences, where an "absolute difference" is the absolute value of a difference between the respective values of two pixels.

A group of pixels 502 illustrated in FIG. 5 includes the current target pixel 504 (shaded) and its four nearest neighbor pixels, which are pixel 506 (immediately above the target pixel), pixel 508 (immediately below the target pixel), pixel 510 (immediately to the left of the target pixel) and pixel 512 (immediately to the right of the target pixel). The group of pixels 522 illustrated in FIG. 5 are the pixels in the immediately preceding image that correspond in location to the pixels of group 502. In particular, the pixels of group 522 are pixel 524 (corresponding in position to target pixel 504), pixel 526 (corresponding in position to pixel 506), pixel 528 (corresponding in position to pixel 508), pixel 530 (corresponding in position to pixel 510), and pixel 532 (corresponding in position to pixel 512). The motion metric for target pixel 504 is calculated as the sum of the absolute differences between each pixel in group 502 and the corresponding pixel in group 504. In other words, the motion metric is calculated as the sum of the following absolute differences: (a) the absolute difference between pixels 504 and 524; (b) the absolute difference between pixels 506 and 526; (c) the absolute difference between pixels 508 and 528; (d) the absolute difference between pixels 510 and 530; and (e) the absolute difference between pixels 512 and 532.

If the motion metric for the target pixel exceeds a threshold, then the target pixel is classified as a "motion pixel". In some embodiments this threshold is set at 20. If the target pixel is not a motion pixel, and its motion metric is less than another threshold, then the target pixel is classified as a "non-motion pixel". In some embodiments, the latter threshold is set at 6. If the target pixel is neither a motion pixel nor a non-motion pixel (i.e., the target pixel is in a range defined by the two thresholds), it is classified as a "mosquito noise pixel".

The pixels classified as mosquito noise pixels are reported as such by the mosquito noise detector 204 (FIG. 2) to the mosquito noise filtering block 206, as indicated at 316 in FIG. 3. The mosquito noise filtering block 206 may apply a filtering process (e.g., a low pass filter) at each mosquito noise pixel identified by the mosquito noise detector. For example, a median filter may be applied at each mosquito noise pixel, where the output of the filter is the median value of the pixels in a three-pixel-by-three-pixel area centered on the mosquito noise pixel.

It may be desirable to provide an overall mosquito metric for each image as an indication of the extent of mosquito noise artifacts in the image. This metric may be used, for example, to determine whether to apply mosquito noise reduction filtering or whether to apply other post-processing procedures to the image. For example, if the metric indicates that the image is highly degraded, it may be determined that mosquito noise reduction filtering should not be applied. In some embodiments, the metric may be calculated by summing the respective motion metric for each mosquito noise pixel in the image and then dividing the resulting sum by the total number of mosquito noise pixels in the image.

By identifying specific pixels that reflect mosquito noise artifacts, the above-described procedure makes it possible to target filtering to mitigate mosquito noise. Thus the negative effect of mosquito noise on image quality may be ameliorated without blurring the entire image. The procedure described above has relatively low computational complexity as compared to frequency domain analyses that may be proposed to address mosquito noise.

Figure 6:
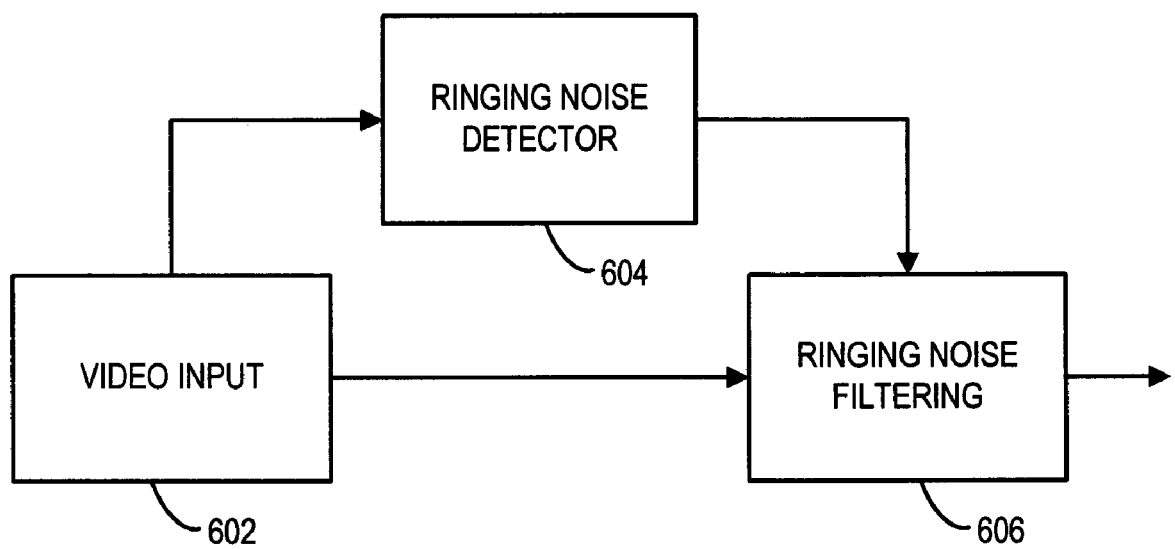
FIG. 6 is a functional block diagram that illustrates some operations of the noise reduction block in some embodiments.

FIG. 6 is a functional block diagram that illustrates aspects of another noise reduction process that may be performed in the post-processing block in accordance with some embodiments. The noise reduction process of FIG. 6 may be performed in addition to, or instead of, the noise reduction process described above with reference to FIGS. 2-5. Block 602 represents the post-processing block (or a noise reduction sub-block) receiving an input video signal (e.g., directly or indirectly from the video decoder 104) that is to be subjected to noise reduction processing. Block 604 represents a process provided in accordance with some embodiments to detect locations (e.g., specific pixels), in the video signal received at 602, which exhibit ringing noise artifacts. Block 606 represents a process in which filtering is applied to the input video signal received at 602 (based on results obtained by the ringing noise detector 604), to mitigate the ringing noise artifacts.

Figure 7:
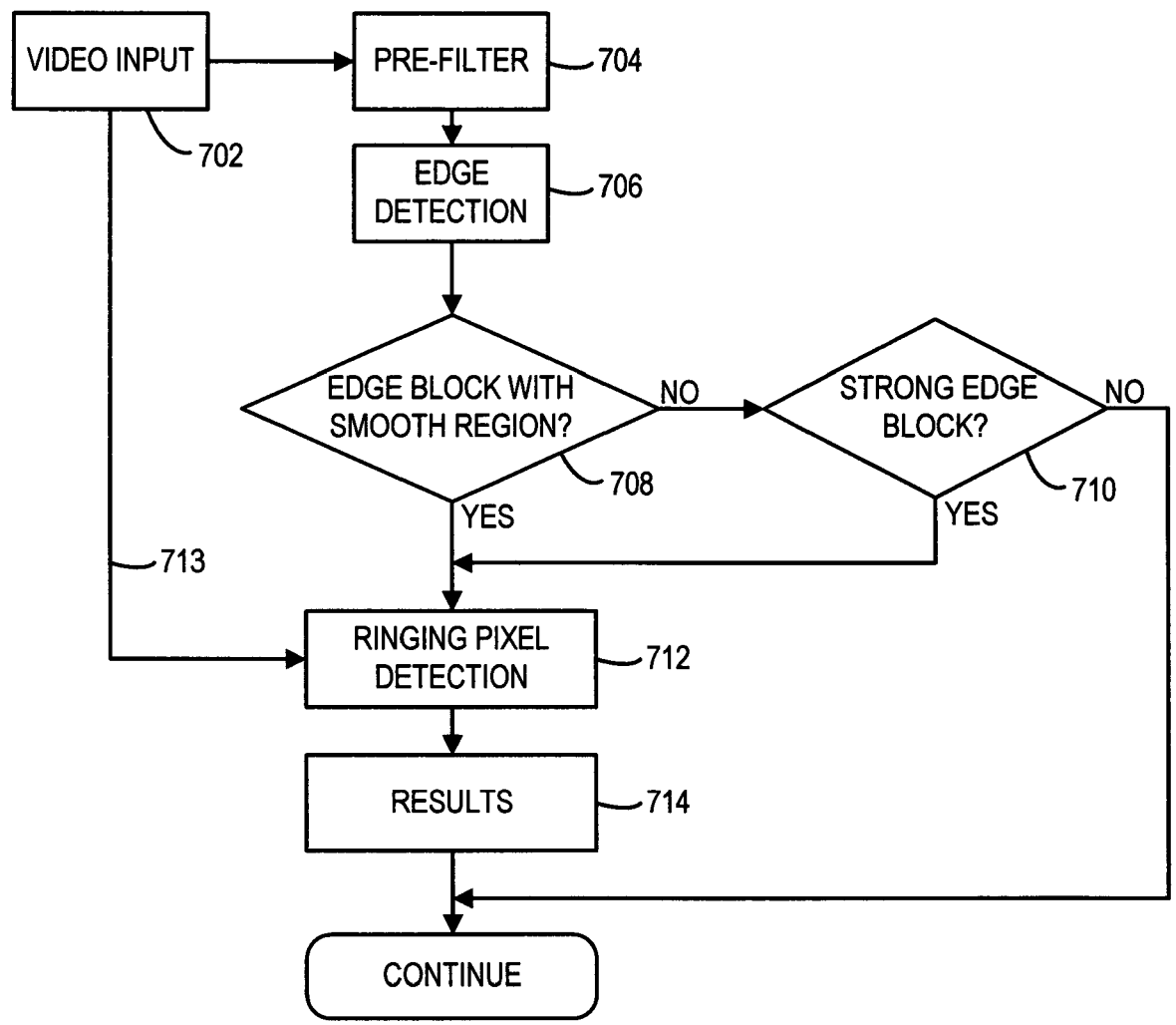
FIG. 7 is a flow chart that illustrates a ringing noise detection process that may be performed in the noise reduction block either in addition to or instead of the mosquito noise detection process of FIG. 3.

FIG. 7 is a flow chart that illustrates a ringing noise detection process performed by the ringing noise detector sub-block of the pre-processing/noise reduction block 106 in accordance with some embodiments. Block 702 in FIG. 7 represents receipt by the ringing noise detector sub-block 604 of the decompressed video signal to be filtered for purposes of ringing noise reduction.

Like the mosquito noise detection process described above, the ringing noise detection process of FIG. 7 may be at least partly based on pixel blocks. 8×8, 10×10 or other block dimensions may be used.

Block 704 in FIG. 7 represents pre-filtering that may be applied to the input video signal before performing edge detection processing. The pre-filtering is not required but may improve the accuracy of the subsequent edge detection. The pre-filtering applied at 704 may be performed in the same manner as the pre-filtering described above in connection with block 304 in FIG. 3.

Edge detection processing as indicated at 706 follows the pre-filtering at 704. With the edge detection processing, the above-described edge metric value EM($x_0$) is calculated for each pixel. Based on the edge metric values, blocks that are likely to exhibit ringing noise artifacts are identified. These blocks may be (a) edge blocks that include a smooth region and (b) blocks having a strong edge. Various type of edge detectors may be employed, including the Sobel edge detector as described above in connection with block 306 in FIG. 3.

With the edge metric having been determined for each pixel in a pixel block, it is next determined (as indicated at 708) whether the pixel block should be classified as an edge block which has a smooth region. The classification of the block depends on the classifications of the pixels within the block as "edge pixels", "non-edge pixels" or "texture pixels". The classification of pixels may be made in the same manner as described above in connection with block 308 in FIG. 3, except that in some embodiments the threshold "edge_th" may be set at 80 instead of 96. A pixel block may be considered to be an edge block if the number of edge pixels in the block exceeds a threshold. In some embodiments, for ringing noise detection purposes the latter threshold is set at zero; in other words, in these embodiments, a pixel block is considered to be an edge block if any of its pixels is an edge pixel.

If a pixel block is considered to be an edge block, it is next determined whether it has a smooth region. The pixel block is considered to have a smooth region if two conditions are satisfied. The first condition is that the number of non-edge pixels in the block exceeds a threshold. In some embodiments the threshold is set at 40. The second condition is that the number of non-edge pixels exceeds a product obtained by multiplying the number of texture pixels in the block by a threshold factor. In some embodiments the threshold factor is set to 1; in this case the second condition becomes simply that the number of non-edge pixels in the block exceeds the number of texture pixels in the block.

In the previous paragraph, a procedure was described for determining whether a block has a smooth region based on edge characteristics of the pixels of the block. However, in other embodiments, the determination of whether a block has a smooth region may be made without utilizing edge characteristics. In this alternative, each pixel in the block is classified as a "low activity" pixel or not a low activity pixel based on the statistical variance of pixel values in the neighborhood of the pixel to be classified. To make this classification, a variance metric $Var(x_0)$ is calculated for the target pixel (the pixel to be classified) according to the following formula:

$$Var(x_0) = (1/N) * \sum_{x \in NH(x_0)} \left( \{x\} - \left( (1/N) * \sum_{x \in NH(x_0)} \{x\} \right) \right)^2$$

where:

$NH(x_0)$ is the set of N pixels (N=9, for example) which forms the neighborhood of the target pixel, and $\{x\}$ is the value of pixel x which is in the neighborhood of the target pixel.

The target pixel is classified as a low activity pixel if its variance metric $Var(x_o)$ is less than a threshold. In some embodiments the threshold may be set at 1024. The pixel block, in turn, may be considered to have a smooth region if the number of low activity pixels in the block exceeds a threshold, which may be set at 20 for purposes of ringing noise detection.

In some embodiments, the following simplified formula may be used to calculate $Var(x_o)$, in order to reduce processing complexity:

$$(1/N) * \sum_{x \in NH(x_0)} |\{x\} - x_0|$$

If a pixel block is not classified at 708 as an edge block which has a smooth region, then it is determined, as indicated at 710, whether the pixel block in question is a "strong edge block". A block is classified as a strong edge block for ringing noise detection purposes if it has at least one pixel for which the edge metric exceeds a threshold. In some embodiments, for ringing noise detection purposes the latter threshold is set to 112.

For each block that has been classified either as a strong edge block or as an edge block that has a smooth region, the pixels in the block are examined pixel by pixel (as indicated at 712) to determine for each pixel whether it has a value that reflects a ringing noise artifact. As indicated by logical connection 713 in FIG. 7, the determination as to whether pixels are ringing pixels may be performed on a version of the input video signal which by-passed pre-filtering.

To determine whether a particular target pixel in such a block is a ringing noise pixel, four local complexity metrics are calculated for the target pixel.

The first local complexity metric $CM\_1h(x_0)$ is calculated as the sum of the absolute difference between the target pixel and the pixel immediately to the left of the target pixel and the absolute difference between the target pixel and the pixel immediately to the right of the target pixel.

The second local complexity metric $CM\_1v(x_0)$ is calculated as the sum of the absolute difference between the target pixel and the pixel immediately above the target pixel and the absolute difference between the target pixel and the pixel immediately below the target pixel.

The third local complexity metric $CM\_2h(x_0)$ is calculated as the absolute difference between the pixel immediately to the left of the target pixel and the pixel immediately to the right of the target pixel.

The fourth local complexity metric $CM\_2v(x_0)$ is calculated as the absolute difference between the pixel immediately above the target pixel and the pixel immediately below the target pixel.

The target pixel is classified as a "ringing pixel" if either one of the following two conditions is met. The first condition is that the first local complexity metric $CM\_1h(x_0)$ exceeds the product obtained by multiplying the third local complexity metric $CM\_2h(x_0)$ by a threshold factor. The second condition is that the second local complexity metric $CM\_1v(x_0)$ exceeds the product obtained by multiplying the fourth local complexity metric $CM\_2v(x_0)$ by a threshold factor. In some embodiments the threshold factor is set at 2 in both cases.

The pixels classified as ringing pixels are reported as such by the ringing noise detector 604 (FIG. 6) to the ringing noise filtering block 606, as indicated at 714 in FIG. 7. The ringing noise filtering block 606 may apply a filtering process (e.g., a low pass filter) at each ringing noise pixel identified by the ringing noise detector. In some embodiments, the filtering at each ringing noise pixel may be the same type of median filter described above in regard to filtering at mosquito noise pixels.

It may be desirable to provide an overall ringing noise metric for each image as an indication of the extent of ringing noise artifacts in the image. This metric may be used, for example, to determine whether to apply ringing noise reduction filtering or whether to apply other post-processing procedures to the image. For example, if the metric indicates that the image is highly degraded, it may be determined that ringing noise reduction filtering should not be applied.

In some embodiments, the overall ringing noise metric for the image may be calculated by summing the respective variance metric $Var(x_0)$ for each ringing pixel in the image and then dividing the resulting sum by the total number of ringing pixels in the image.

By identifying specific pixels that reflect ringing noise artifacts, the above described procedure makes it possible to target filtering to mitigate ringing noise. Thus the negative effect of ringing noise on image quality may be ameliorated without blurring the entire image.

The mosquito noise detector and/or ringing noise detector blocks, or other blocks herein, may be implemented as application-specific logic circuitry or by one or more programmable processors controlled by software instructions stored in a memory or memories coupled to the processor or processors.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   making a first determination in a noise reduction circuit after decoding of a video signal as to whether a current pixel in the decoded video signal has a value which reflects a mosquito noise artifact; and
   determining in the noise reduction circuit whether to apply a filtering process to the decoded video signal at said current pixel based on a result of said first determination;
   wherein said first determination includes comparing a motion metric for the current pixel with a first threshold and with a second threshold that is lower than the first threshold, said current pixel being determined to reflect a mosquito noise artifact if said motion metric is between said first and second thresholds;
   wherein said motion metric is calculated by adding absolute differences between a group of pixels centered on said current pixel and corresponding pixels of a previous image in a sequence of images.

2. The method of claim 1, further comprising:
   before making said first determination, pre-filtering said video signal at said current pixel by applying a weighting matrix to a neighborhood of said current pixel.

3. The method of claim 1, further comprising:
   median filtering the video signal at the current pixel when the current pixel is determined to have a value which reflects a mosquito noise artifact.

4. The method of claim 1, wherein said group of pixels consists of the current pixel, a pixel that is immediately above the current pixel, a pixel that is immediately below the current pixel, a pixel that is immediately to the left of the current pixel and a pixel that is immediately to the right of the current pixel.

5. The method of claim 4, wherein the first threshold equals 20 and the second threshold equals 6.

6. A method comprising:
   making a first determination in a noise reduction circuit after decoding of a video signal as to whether a current pixel in the decoded video signal has a value which reflects a mosquito noise artifact; and
   determining in the noise reduction circuit whether to apply a filtering process to the decoded video signal at said current pixel based on a result of said first determination;
   wherein:
   said first determination is made only with respect to selected pixel blocks of an image;
   the selected pixel blocks are selected based at least in part on a pixel block activity metric; and
   the activity metric is calculated only for (a) pixel blocks that are a first type of edge blocks and satisfy a first edge criterion; and (b) pixel blocks that are adjacent to at least one pixel block that is a second type of edge block and satisfies a second edge criterion that is different from the first edge criterion.

7. The method of claim 6, further comprising:
   applying edge detection processing to at least some pixels of the video signal;
   classifying some pixel blocks of the video signal as edge blocks; and
   classifying some pixel blocks of the video signal as strong edge blocks.

8. The method of claim 7, wherein:
   a pixel block is classified as an edge block based on at least four pixels in said pixel block having an edge metric that exceeds a first threshold; and
   a pixel block is classified as a strong edge block based on at least one pixel in said pixel block having an edge metric that exceeds a second threshold, said second threshold higher than said first threshold.

9. The method of claim 6, further comprising:
   classifying at least some of said selected pixel blocks as low activity blocks.

10. The method of claim 9, wherein one of the selected pixel blocks is classified as a low activity block based on (a) a number of non-edge pixels in said one of the selected pixel blocks exceeding a first threshold and (b) the number of non-edge pixels in said one of the selected pixel blocks exceeding a number of texture pixels in said one of the selected pixel blocks.

11. The method of claim 10, wherein a pixel is classified as a non-edge pixel if it has an edge metric that is less than a second threshold and the pixel is classified as a texture pixel if it has an edge metric that is at least equal to the second threshold and does not exceed a third threshold that is higher than the second threshold.

12. The method of claim 9, wherein one of the selected pixel blocks is classified as a low activity block based on variance metrics of pixels in the one of the selected pixel blocks, said variance metrics calculated according to either $$Var(x_0) = (1/N)^* \sum_{x \in NH(x_0)} \left( \{x\} - \left( (1/N)^* \sum_{x \in NH(x_0)} \{x\} \right) \right)^2 \text{ or}$$

$$Var(x_0) = (1/N)^* \sum_{x \in NH(x_0)} |\{x\} - x_0|$$

where:
   $NH(x_0)$ is the set of N pixels (N=9, for example) which forms the neighborhood of a target pixel, and
   $\{x\}$ is the value of pixel x which is in the neighborhood of the target pixel.

13. A system comprising:
   a video signal decoder; and
   a noise reduction circuit coupled to said video signal decoder and operative to:
   detect that a current pixel in a video signal decoded by the video signal decoder exhibits a mosquito noise artifact; and in response to detecting that said current pixel exhibits a mosquito noise artifact, apply a filtering process at said current pixel in the video signal decoded by the video signal decoder;

wherein said detecting includes comparing a motion metric for the current pixel with a first threshold and with a second threshold that is lower than the first threshold, said current pixel being detected to exhibit a mosquito noise artifact if said motion metric is between said first and second thresholds;

wherein said motion metric is calculated by adding absolute differences between a group of pixels centered on said current pixel and corresponding pixels of a previous image in a sequence of images.

14. The system of claim 13, wherein said noise reduction circuit is further operative to:

before detecting that the current pixel exhibits a mosquito noise artifact, pre-filter said video signal at said current pixel by applying a weighting matrix to a neighborhood of said current pixel.

15. The system of claim 13, wherein said noise reduction circuit is further operative to:

median filter the video signal at the current pixel when the noise reduction circuit detects that the current pixel exhibits a mosquito noise artifact.

16. The system of claim 13, wherein said group of pixels consists of the current pixel, a pixel that is immediately above the current pixel, a pixel that is immediately below the current pixel, a pixel that is immediately to the left of the current pixel and a pixel that is immediately to the right of the current pixel.

17. The system of claim 16, wherein the first threshold equals 20 and the second threshold equals 6.

18. A system comprising:

a video signal decoder; and a noise reduction circuit coupled to said video signal decoder and operative to:

detect that a current pixel in a video signal decoded by the video signal decoder exhibits a mosquito noise artifact; and in response to detecting that said current pixel exhibits a mosquito noise artifact, apply a filtering process at said current pixel in the video signal decoded by the video signal decoder;

wherein:

said detecting is performed only with respect to selected pixel blocks of an image;

the selected pixel blocks are selected based at least in part on a pixel block activity metric; and the activity metric is calculated only for (a) pixel blocks that are a first type of edge blocks and satisfy a first edge criterion; and (b) pixel blocks that are adjacent to at least one pixel block that is a second type of edge block and satisfies a second edge criterion that is different from the first edge criterion.

19. The system of claim 18, wherein said noise reduction circuit is further operative to:

apply edge detection processing to at least some pixels of the video signal;

classify some pixel blocks of the video signal as edge blocks; and classify some pixel blocks of the video signal as strong edge blocks.

20. The system of claim 19, wherein:

a pixel block is classified as an edge block based on at least four pixels in said pixel block having an edge metric that exceeds a first threshold; and a pixel block is classified as a strong edge block based on at least one pixel in said pixel block having an edge metric that exceeds a second threshold, said second threshold higher than said first threshold.

21. The system of claim 18, wherein the noise reduction circuit is further operative to:

classify at least some of said selected pixel blocks as low activity blocks.

22. The system of claim 21, wherein one of the selected pixel blocks is classified as a low activity block based on (a) a number of non-edge pixels in said one of the selected pixel blocks exceeding a first threshold and (b) the number of non-edge pixels in said one of the selected pixel blocks exceeding a number of texture pixels in said one of the selected pixel blocks.

23. The system of claim 22, wherein a pixel is classified as a non-edge pixel if it has an edge metric that is less than a second threshold and the pixel is classified as a texture pixel if it has an edge metric that is at least equal to the second threshold and does not exceed a third threshold that is higher than the second threshold.

24. The system of claim 21, wherein one of the selected pixel blocks is classified as a low activity block based on variance metrics of pixels in the one of the selected pixel blocks, said variance metrics calculated according to either $$Var(x_0) = (1/N)^* \sum_{x \in NH(x_0)} \left( \{x\} - \left( (1/N)^* \sum_{x \in NH(x_0)} \{x\} \right) \right)^2 \text{ or}$$

$$Var(x_0) = (1/N)^* \sum_{x \in NH(x_0)} |\{x\} - x_0|$$

where:

$NH(x_0)$ is the set of N pixels (N=9, for example) which forms the neighborhood of a target pixel, and $\{x\}$ is the value of pixel x which is in the neighborhood of the target pixel.

* * * * *